(12) United States Patent
Milito et al.

(10) Patent No.: US 7,325,048 B1
(45) Date of Patent: Jan. 29, 2008

(54) METHOD FOR AUTOMATICALLY CREATING A MODEM INTERFACE FOR USE WITH A WIRELESS DEVICE

(75) Inventors: Chad Milito, Ogden, UT (US); Mark Price, Midvale, UT (US); R. Kenin Page, Sandy, UT (US)

(73) Assignee: 3Com Corporation, Marlborough, MA (US)

( * ) Notice: Subject to any disclaimer, the term of this patent is extended or adjusted under 35 U.S.C. 154(b) by 1101 days.

(21) Appl. No.: 10/189,210

(22) Filed: Jul. 3, 2002

(51) Int. Cl.
*G06F 15/177* (2006.01)
*H04B 7/00* (2006.01)
*H04M 1/00* (2006.01)

(52) U.S. Cl. .............. 709/220; 709/221; 709/222; 455/556.1; 455/41.1

(58) Field of Classification Search ........ 709/220–223; 455/556–557, 41.1–41.2
See application file for complete search history.

(56) References Cited

U.S. PATENT DOCUMENTS

| | | | | |
|---|---|---|---|---|
| 5,430,793 A | * | 7/1995 | Ueltzen et al. | 379/93.29 |
| 5,581,261 A | * | 12/1996 | Hickman et al. | 709/221 |
| 5,978,762 A | * | 11/1999 | Smyth et al. | 704/229 |
| 6,195,564 B1 | * | 2/2001 | Rydbeck et al. | 455/557 |
| 6,493,751 B1 | * | 12/2002 | Tate et al. | 709/221 |
| 6,785,556 B2 | * | 8/2004 | Souissi | 455/557 |
| 2003/0003869 A1 | * | 1/2003 | Fujii | 455/41 |

OTHER PUBLICATIONS

The Microsoft Computer Didionary. 5th ed. Redmond, WA: Microsoft Press. May 1, 2002.*
Shorley R. (2000), The Bluetooth Technology: Merits and Limitations, Int. Conf. On Personal Wireless Comunications ICPWC'2000, pp. 80-84.*

* cited by examiner

*Primary Examiner*—Glenton B. Burgess
*Assistant Examiner*—Brendan Y. Higa

(57) ABSTRACT

A method for automatically creating a modem interface on a computer device for use with a wireless device. The method of the present invention creates a modem interface without requiring the user to execute a standard operating system's manual modem installation procedure. The modem interface can then be used as a standard interface to a wireless device. This allows existing software to be used in conjunction with the wireless device connected to the modem interface.

7 Claims, 3 Drawing Sheets

METHOD FOR AUTOMATICALLY CREATING A MODEM INTERFACE FOR USE WITH A WIRELESS DEVICE

BACKGROUND OF THE INVENTION

1. The Field of the Invention

This invention relates generally to the field of wireless communications. In particular, embodiments of the present invention relate to a method of automatically creating a modem interface for use with a wireless device, such as a Bluetooth device.

2. The Relevant Technology

Short range wireless communication schemes are increasingly used as an alternative to wire-based networks to interconnect computers and computer devices. The use of wireless communications provides a number of advantages, including the elimination of complex, expensive, and inconvenient wire-based connection schemes. Moreover, a wireless computing device is not hindered by wired connections and is free to move around an office or building without losing the corresponding wireless connection.

While a number of wireless communications standards have been developed for such applications, one popular example is known as "Bluetooth." The Bluetooth standard uses low power radio frequencies to allow communication between various devices such as mobile phones, laptop and desktop computers, printers, modems, PDAs, etc. This technology was originally envisioned for the purpose of replacing cabling and other hard-wired connection schemes used to connect auxiliary devices to a desktop or laptop computer. However, Bluetooth has further evolved into a method of sending both data and voice signals between a wide range of devices. For example, a Bluetooth-enabled PDA could be configured to automatically connect to a Bluetooth-enabled communications line within a building, therefore gaining wireless access to computing resources, such as printers, modems, facsimile machines, an Internet portal, and the like.

In an effort to ensure compatibility among Bluetooth implementations, a Bluetooth special interest group (SIG) was formed. One of the main objectives of the Bluetooth SIG is to formulate a standardized specification for every element of Bluetooth. The specification dictates numerous software and hardware characteristics so that devices made by different manufacturers will be compatible with one another. The specification dictates all aspects of Bluetooth technology from the software stack necessary to run Bluetooth devices to the actual hardware requirements.

As per this standard, Bluetooth compatible technology is composed of multiple components that together provide for wireless communication capabilities. For example, each Bluetooth-compatible device is configured with a radio that can transmit and receive wireless signals on a particular frequency band. In addition, there are certain structural elements required for connecting the radio to the specific host device. Further, each Bluetooth-compatible device is also configured with particular software to allow the device to properly process and route data or voice signals. This software is typically referred to as the "protocol stack" because it is composed of numerous components that are each configured to perform a particular function. Information is generally passed between the respective layers of the stack either from the bottom of the stack to the top or vice versa. The protocol stack is further broken up into a "transport protocol group," a "middleware protocol group" and an "application protocol group."

In general, the transport protocol group is designed to allow Bluetooth devices to locate one another within a Bluetooth network, and to manage the links that allow higher layer protocols and applications to pass data through the transport protocols. The transport protocol group is comprised of a radio, a baseband controller, a link manager, a logical link control and adaptation protocol (L2CAP), and a host controller interface (HCI). The baseband controller defines how devices search for one another and how they connect to one another. The baseband controller also defines the master and slave roles between devices. The link manager supervises the creation of pairing between devices and the encryption of data. The link manager also supervises power control among devices. For example, the link manager can initiate a low power adjustment between devices to conserve energy. The L2CAP supports the protocol multiplexing that allows multiple protocols to utilize the same air-interface. It also maintains the desired level of service among devices. The HCI allows higher layers of the stack to access the baseband controller and link manager. The HCI is not a required part of the Bluetooth specification and it can be located above or below the L2CAP depending on the configuration of the particular Bluetooth system.

The radio, link manager and baseband controller are sometimes grouped together to form what is referred to as a Bluetooth module. The remaining components of the transport layer are typically located on the actual Bluetooth host device.

The middleware protocol group is directed to functionality that facilitates communication between host applications and the Bluetooth module. The protocols can include both third-party protocols and industry standard protocols specified by the Bluetooth SIG. The middleware protocol group specifically includes a RFCOMM, a service discovery protocol (SDP), a set of IrDa interoperability protocols, and a telephony control protocol (TCS). The RFCOMM protocol creates virtual serial ports to facilitate the replacement of cables with a wireless Bluetooth interface. The SDP protocol defines a standard method for Bluetooth devices to discover and learn about the services offered by other Bluetooth devices within the network. The set of IrDa interoperability protocols helps to define the syntax of the data to be exchanged between devices. The TCS protocol is designed to control the exchange of voice communications between devices.

The application protocol group consists of the various applications that utilize Bluetooth communications. The applications may be unaware that data is being transmitted over a Bluetooth air-interface rather than a standard cable, or the application may be specifically designed to interact with Bluetooth devices.

Bluetooth devices form what are known as "piconets" with one another. A piconet is comprised of one Bluetooth device acting as a master and numerous other devices acting as slaves. Both the master and the slave devices can transmit and receive data from one another. However, the master device defines the data hopping sequence and is usually the device that initiates the communication. Initiation of a communication depends, in part, on the configuration state of a device. For example, an "active state" is a system configuration in which the slave device is always listening for transmissions from the master. In a "parked state" the slave device is only periodically listening to the master. Thus, a parked slave must become active before it can communicate normally with the master. In addition, there is a sniff state and a hold state, both of which are considered active states. The sniff and hold states are used as alternatives to the full active state for the purpose of conserving power. A slave device in a sniff mode essentially communicates with the master at regular intervals rather than always listening. A slave device in a hold mode essentially stops listening to the master for a specified period of time.

There are several limitations present in the Bluetooth standard that can degrade the overall operating efficiency of a Bluetooth network. A primary limitation relates to the number of active slave devices that can be connected within a single piconet. Up to seven active slave devices and up to 255 parked slave devices can be linked to a master device in a single piconet at a given time. The seven device limitation prevents the master from actively communicating with more than seven slave devices at any given time. Obviously, the seven device limitation can limit the functionality that is available to a master device at any given time, which may in turn limit the operating efficiency of the Bluetooth network.

For example, if an application needs to establish a communication link with the Internet, it may request a Bluetooth-connection with a Bluetooth enabled modem. However, if the modem is attached to one of the parked Bluetooth slave devices (i.e., not available as one of the seven active devices), it may take a relatively long amount of time before the parked device becomes active and actually processes the request from the application. This time delay is obviously undesirable.

In addition, one Bluetooth device may be part of multiple piconets. For example, the master of one piconet may also be a slave in another piconet. In this scenario, a slave device from one piconet could order a "print" command. That print command could be routed through the master to a slave which happens to be a master of another piconet that contains a printer. That second master will then send the signal to the printer. However, this type of situation could limit the bandwidth of the second master as it is routing the print command (and associated print data) to the printer, thereby limiting its ability to respond to other requests within its piconet. Again, this problem is in large part a result of the seven device limitation.

There are a number of methodologies used to operably interface a Bluetooth module with a computing device. One method utilizes a pre-defined modem interface that logically resides between the Bluetooth module and the computer operating system. Using this approach, the Bluetooth module is connected to a particular port on the computer device. Through a fairly complex and extensive installation process, the operating system is configured in a manner such that the Bluetooth module appears as a modem that is accessible via the predefined modem interface. This method is preferable in some circumstances because it allows existing operating systems and legacy software products that are already configured to interface with modems to utilize the Bluetooth module. Thus, the approach allows Bluetooth devices to be used with existing software without requiring the user to perform extensive software upgrading; the computer device merely communicates with the Bluetooth module in the same manner as a standard modem.

With this approach, the Bluetooth protocol decodes the modem commands into Bluetooth commands. For example, the Bluetooth protocol stack is configured to receive AT commands that are intended for a modem. The RFCOMM module in the middleware protocol group emulates the virtual serial port and is capable of receiving modem commands. However, one drawback with this approach is the somewhat complex and cumbersome modem installation process that must first be performed to create the modem interface for use with the Bluetooth module. For example, this process typically requires a user to enter detailed technical information about the port location, the modem type, and other related information. Most computer users do not possess the necessary level of skills provide this type of information, and therefore it is subject to errors. Thus, it would be preferable to automate the overall process.

Therefore, there is a need for a method of automatically creating a modem interface on a computer device for use with a wireless module, such as a Bluetooth module. The method should require little or no input from the user and should be user friendly.

SUMMARY OF EMBODIMENTS OF THE INVENTION

These and other problems in the prior art are addressed by embodiments of the present invention, which relates to a method of automatically creating a modem interface on a computer device for use with a wireless device, such as a Bluetooth module. Preferred methods of the present invention automatically create a modem interface without requiring the user to execute a standard operating system's manual modem installation procedure. The modem interface can then be used as a standard interface to a Bluetooth module. This allows existing legacy software to be used in conjunction with the Bluetooth module, which is functionally available via the predefined modem interface.

In one presently preferred embodiment, the automated installation procedure is implemented within the context of a Microsoft® Windows environment. Before invoking an automated modem installation procedure, the process first manipulates the settings of the operating system in a manner so that standard installation dialogs are not invoked. In this way, the entire process in transparent to the user in that no user intervention and/or selection of parameters is required.

In a preferred embodiment, values contained with the operating system registry database are directly manipulated by the process. The values are changed in such a manner such that, during the subsequent automated installation, no dialogs are invoked by the operating system. Once the registry is thus manipulated, the process continues with a series of automated "macro" steps that automatically select and add a modem interface that corresponds to the installed Bluetooth module device. Once this installation process is complete, the process then re-manipulates the contents of the registry so as to return it to its original state. In this way, in the event that an actual modem is installed on the system, the correct process with be followed by the operating system's installation procedure.

At the conclusion of the procedure, a modem interface will have been automatically installed, which can then be used by applications to interact with the Bluetooth module. Importantly, the process is transparent to the user, thereby providing an extremely simplistic installation procedure. This avoids errors on the user's part, and helps insure a smooth installation process. Moreover, it results in a operating interface for the Bluetooth device that is usable by a wide number of existing legacy applications. Consequently, the Bluetooth capabilities can be utilized by existing applications without the need for new program interfaces and the like.

These and other advantages and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be given by making reference to a specific embodiment that is illustrated in the appended drawings. These drawings depict only one embodiment of the invention and are not to be considered limiting of its scope.

DETAILED DESCRIPTION OF PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general, the present invention relates to a method of automatically creating a predefined modem interface on a computer device for use with a wireless device. In particular, the method of the present invention creates the modem interface without requiring the user to execute a standard operating system's manual modem installation procedure. The modem interface can then be used as a standard software interface to the wireless device, such as a Bluetooth radio module. This allows existing legacy software to utilize the services of the wireless device connected via the modem software interface. Also, while embodiments of the present invention are described in the context of using the modem interface with a Bluetooth wireless module, it will be appreciated that the teachings of the present invention are applicable to other applications as well. For example, a similar method could be used with 802.11 or UWB wireless modules.

Figure 1:
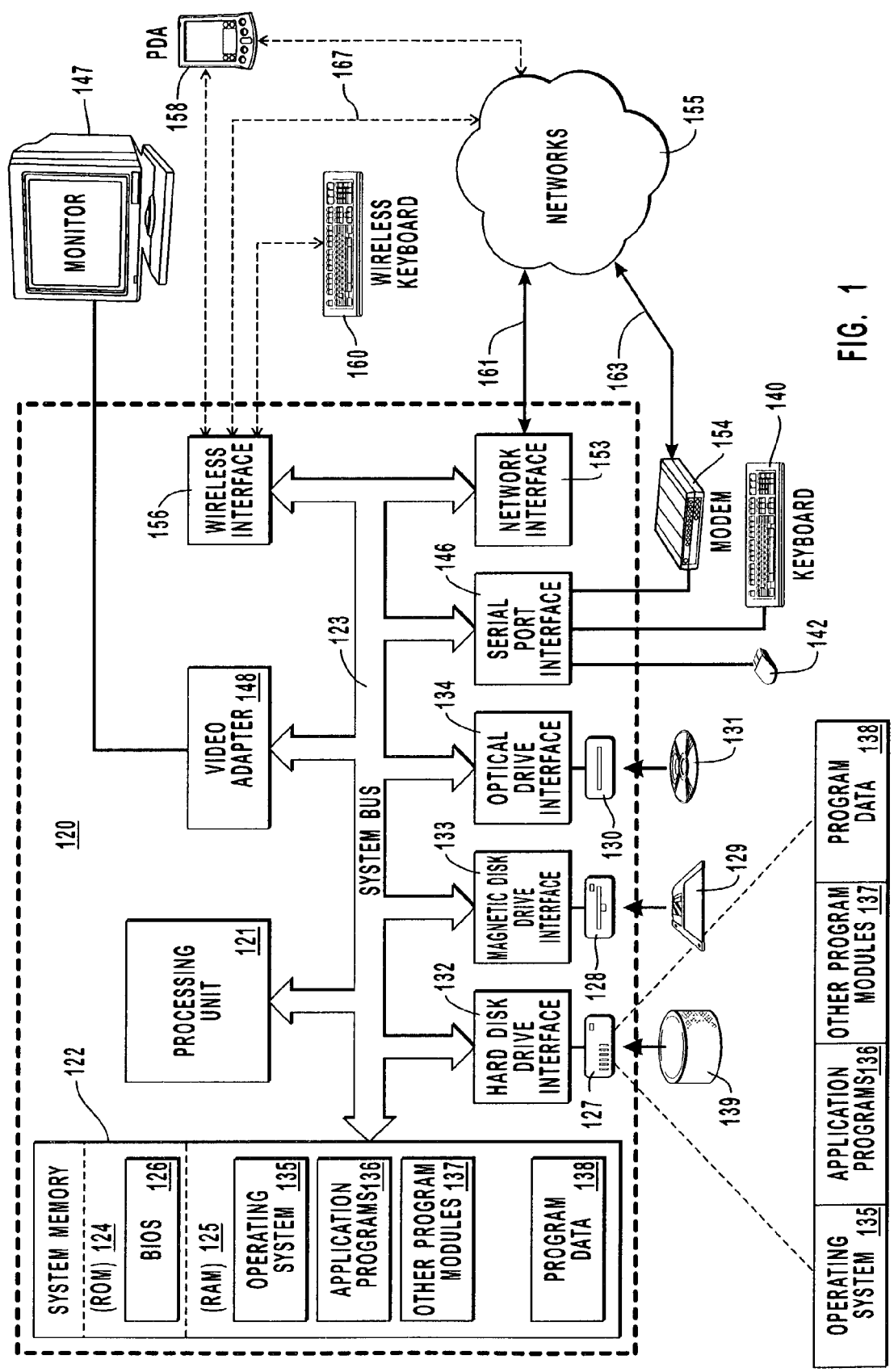
FIG. 1 illustrates an example processing system that provides a suitable operating environment for the present invention.

FIG. 1 and the following discussion are intended to provide a brief, general description of an example of a suitable computing environment in which embodiments of the present invention may be implemented. Although not required, embodiments of the invention may be described in the general context of computer-executable instructions, such as program modules, being executed by computers operating within network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that embodiments of the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

With reference to FIG. 1, an example system for implementing embodiments of the invention includes a general-purpose computing device, one example of which is shown in the form of a conventional computer 120. Computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and/or an optical disk drive 130 for reading from or writing to removable optical disk 131 such as a CD-ROM or other optical media. In this particular example, the magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Of course, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 and/or RAM 125. Examples include an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a wireless interface, a parallel port, a game port, a universal serial bus (USB) and the like. A monitor 147 or another display device is also connected to system bus 123 via an interface, such as video adapter 148. In addition to the monitor, some computers may include other peripheral output devices (not shown), such as speakers and printers.

The computer 120 may be operatively connected to a networked environment, an example of which is designated in FIG. 1 as network 155. As is well known, network 155 may be used to connect computer 120 to other remote computers, which may be personal computers, servers, routers, network PCs, peer devices or other common network nodes, and typically include many or all of the elements described above relative to the computer 120. Examples of various logical connections to network 155 are depicted in FIG. 1 include a wireless network 167, a local area network (LAN) 161, and a wide area network (WAN) 163. Each of the logical connections 167, 161, 163 represent a different way for the computer 120 to connect to the network 155. The wireless network 167 may utilize radio frequencies, microwaves, infrared light, etc. to transmit signals via the wireless interface 156 to the network 155. The LAN 161 utilizes, for example, an Ethernet, a USB network, or a token ring network to transmit signals from the network interface 153 to the network 155. The WAN 163 utilizes a modem 154 to decode the signals and a standard telephone line, wireless telephone line, coaxial cable, or fiber optic cable to transmit the signals from the serial port interface 146 to the networks 155. Such networking environments are commonplace in office-wide or enterprise-wide computer networks, intranets and the Internet.

By way of example, the wireless interface 156 could be implemented as a short range radio transceiver that preferably utilizes low power radio frequencies to transmit information over relatively short distances. For example, the wireless interface could be implemented as a Bluetooth or an 802.11 transceiver module. In this way, the wireless interface 156 could be used to wirelessly connect the computer 120 to a wide range of external devices, computing devices, networks, etc. For example, a Bluetooth module may be connected to the computer 120 to allow for a wireless connection between the computer 120 and a PDA 158 similarly equipped with a Bluetooth module. In addition, the wireless interface 156 can connect to devices that typically use other interfaces when communicating with the computer 120. For example, keyboards are typically connected to the computer 120 via the serial port interface 146, but may also be connected with a Bluetooth module. To do so, the wireless interface 156 typically includes a protocol that is capable of emulating a standard interface communication sequence, such as a serial port. For example, in a Bluetooth system, the RFCOMM protocol can be used to create virtual serial ports so that serial devices can be wirelessly connected to the computer 120 via the wireless interface 156 (Bluetooth module) without extensive manipulation of existing software drivers, application software, etc.

For purposes of illustration, wireless transceiver module 156 in FIG. 1 is implemented as a Bluetooth compatible wireless transceiver or radio. As previously discussed, a Bluetooth transceiver device 156 is configured with a radio that can transmit and receive signals on a particular frequency band. In addition, the device is typically programmable, and is configured with software to process and route wireless signals. This software is implemented as a protocol stack, which is comprised of functional components that are organized within adjacent layers to form a logical stack. Also, depending on the implementation scheme, certain of the components of the stack reside within the host device (such as computer 120) memory and are executed by the host processor (121 in FIG. 1), and other components of the stack are stored and executed at the Bluetooth module itself (e.g., 156 in FIG. 1).

Figure 2:
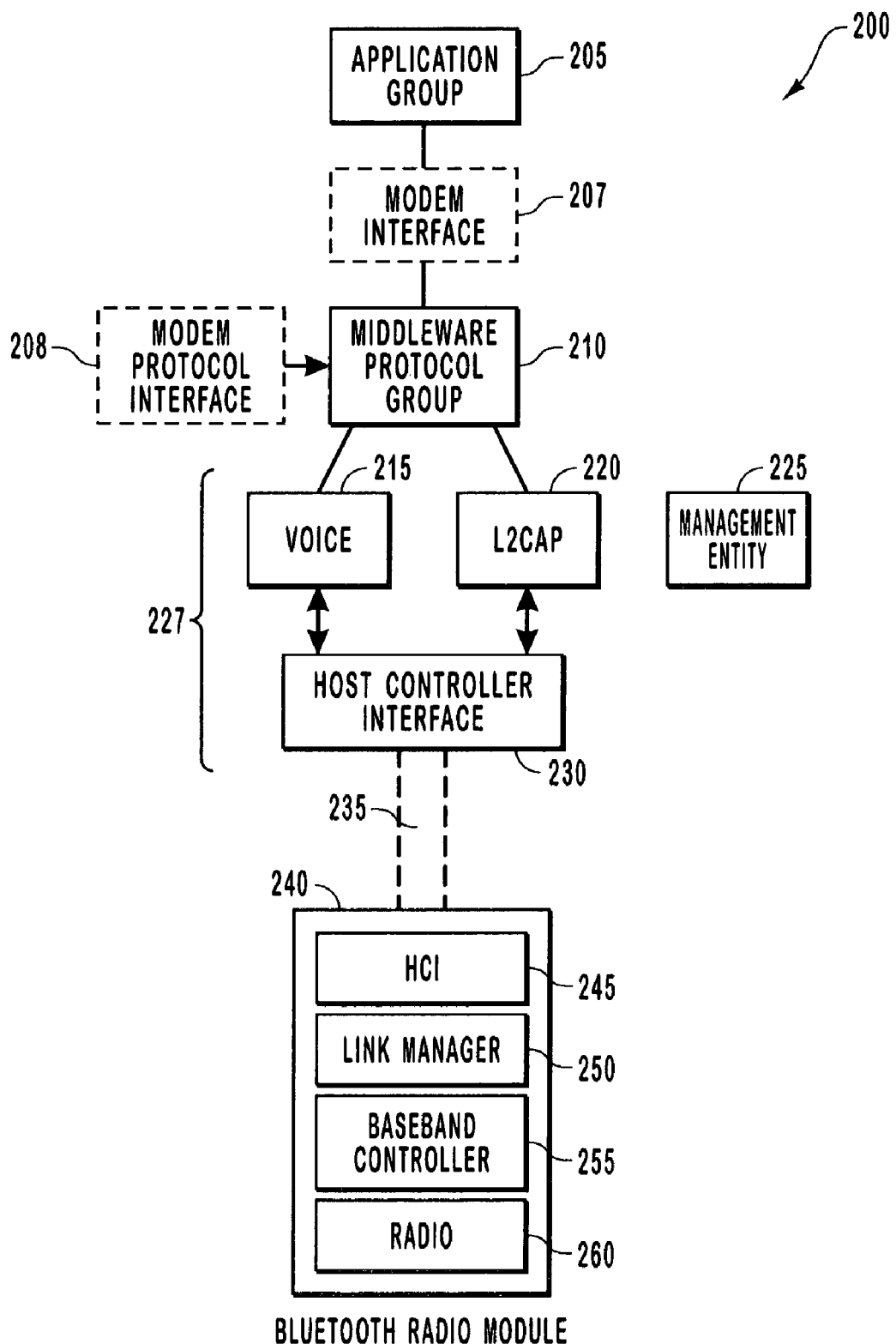
FIG. 2 illustrates a simplified functional block diagram showing a Bluetooth protocol stack implemented in accordance with the present invention.

Reference is next made to FIG. 2 which illustrates a simplified functional block diagram, designated generally at 200, of a Bluetooth host-based protocol stack implemented in accordance with the teachings of the present invention. Again, Bluetooth is one example of a wireless standard which could be used to implement the wireless module in accordance with the present invention. The illustrated protocol stack shows each of the various logical functional layers that the Bluetooth command and/or data follow when performing a Bluetooth operation. For example, a text editor application may initiate a print command and associated data, which travels down through each layer of the protocol stack and across a Bluetooth wireless channel to a Bluetooth-enabled printer. The data then flows through the printer Bluetooth stack, resulting in the printing of the text document.

In the illustrated example of FIG. 2, the protocol stack 200 is comprised of multiple sub-elements which are vertically positioned to indicate a sequence of communication. Typically, information is passed either from the bottom to the top or vice versa. The uppermost element of the protocol stack 200 is the Application Group 210. The Application Group 210 represents the higher level applications that directly interact with the user, and can include, for example word processors, communications packages, spreadsheets, and the like. The application often sends commands to devices that may be connected via a Bluetooth radio such as a printer, a modem, a fax, etc. The next element down in the protocol stack 200 is the Middleware Protocol Group 215. The Middleware Protocol Group 215 represents the various protocols that are used as channels between the upper Application Group 210 and the lower levels of the protocol stack 200. These protocols include TCP, TCS-BIN, PPP, etc.

The applications in the Application Group 210 may use one or more of the protocols in the Middleware Protocol Group 215 to communicate with the lower levels 227 of the protocol stack 200. However, typically the applications must interact with the Middleware Protocol Group 215 via a predefined Bluetooth-oriented software interface. As such, the applications would need to be implemented so as to be capable of communicating with that specific and defined interface. However, in the illustrated embodiment, applications interface with the Bluetooth stack via a predefined modem interface, which is functionally represented at 207. Since the modem interface 207 is one that is well known and commonly implemented, many legacy applications are typically already implemented so as to be capable of operably interacting with the interface. Thus, the applications can "communicate" with the Bluetooth stack in a manner as if it were a modem. Consequently, the Bluetooth module can be utilized without extensive program changes, etc. Thus, in the illustrated embodiment, in addition to the standard Bluetooth protocol channels, the Middleware Protocol Group 215 also contains a "protocol channel" in the form of a modem protocol interface, designated at 208. This functional block converts the well-known modem commands received via the predefined modem interface 207 into Bluetooth commands.

The remainder of the flow chart shown in FIG. 2 represents the lower levels 227 of the protocol stack 200. As is further shown in FIG. 2, A Host Controller Interface (HCI) 230 is located within the lower level 227 of the protocol stack 200 and within the Bluetooth module 240. The HCIs 230, 245 create a standardized interface between the lower level 227 of the protocol stack 200 and the Bluetooth module 240. The standard interface is designed to allow for compatibility among Bluetooth module manufacturers. The connector 235 connects the Bluetooth radio module 240 to the lower level 227 of the protocol stack 200. The connector 235 is preferably implemented as a standard connector such as USB, serial, parallel, and the like. The Bluetooth radio module 240 further comprises a HCI 245, a Link Manager 250, a Baseband Controller 255 and a Radio 260. The Link Manager 250 manages the properties of the air interface between the Bluetooth devices. The Baseband controller 255 manages how the Bluetooth devices talk to one another. The radio 260 transmits and receives the low power radio signals across the air interface between Bluetooth devices.

As is further shown in the example of FIG. 2, data packets are routed to either a Voice 215 element or a L2CAP 220 element depending on whether the information contains voice signals or data signals. Voice signals are sent through the Voice 215 element and data signals are sent through the L2CAP 220 element. In addition, the L2CAP element 220 is involved in further routing data signals to and from protocols in the middleware protocol group 210. The Management Entity 225 manages how the other elements perform their functions. Information is never directly sent through the Management Entity 225 but it is involved in establishing connections between devices and then managing the flow of information through each element.

Figure 3:
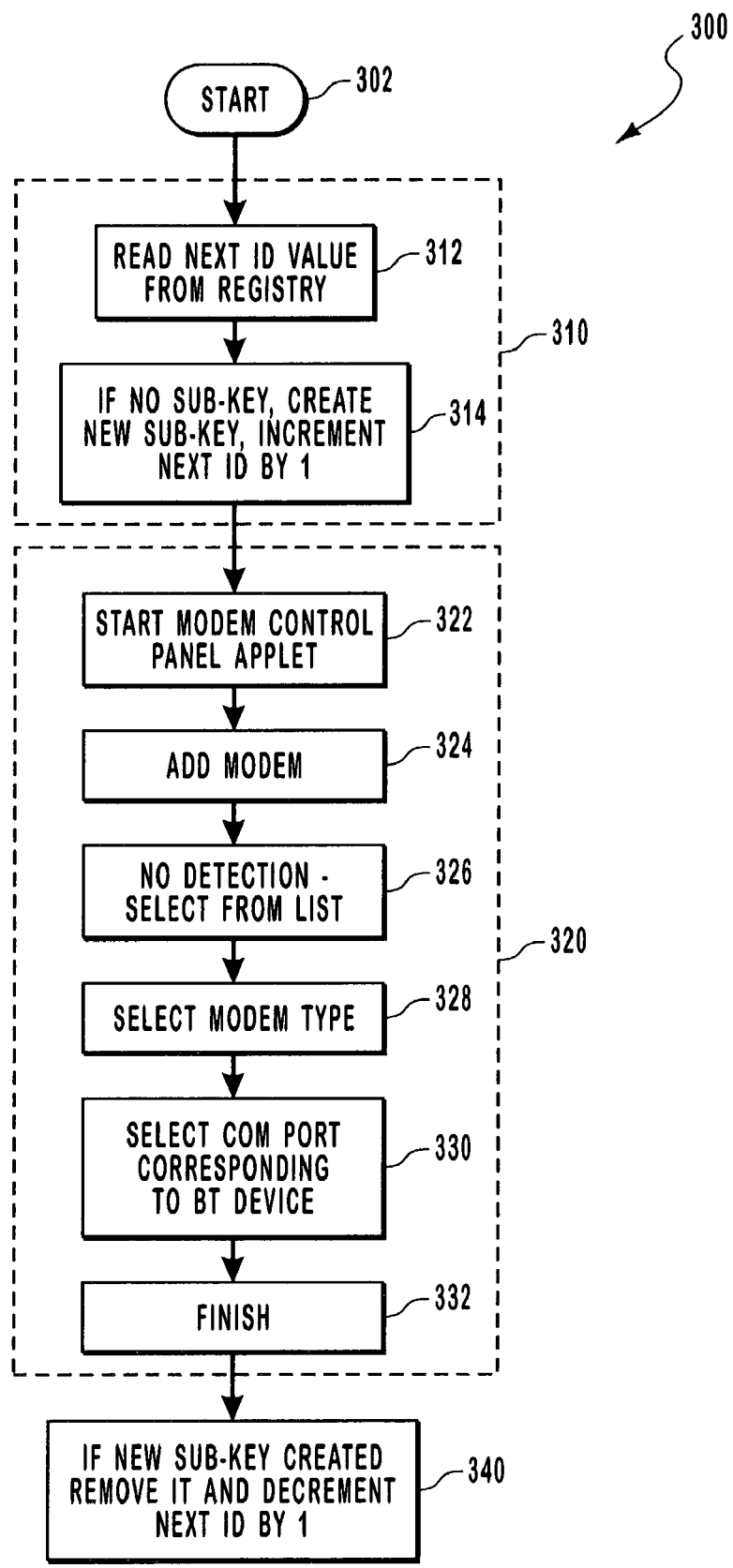
FIG. 3 illustrates a flow chart that shows one presently preferred embodiment of the process flow used to automate the process for creating a modem interface that can be used in conjunction with a Bluetooth radio module.

Reference is next made to FIG. 3, which is a flow chart, designated generally at 300, illustrating one presently preferred embodiment of the process steps used for automatically creating the predefined modem interface (207 in FIG. 2) for a Bluetooth device. In the illustrated embodiment, the process is implemented in the context of a Microsoft® Windows-based operating environment. However, it will be appreciated that the same principles could be utilized in other operating environments.

In a typical modem installation in the Windows environment, if the user has never before initialized the "TAPI" services for Dial-Up Networking, a Location Information dialog will automatically be invoked that requests the user to enter information relevant to a modem installation; for example, it will request the user to enter area code and country information. However, with some versions of Windows, this process is difficult to automate (i.e., and leave the user out of the process). However, the present process automates the process in a manner such that the dialog with the user is completely bypassed.

In general, the illustrated process utilizes existing operating system resources to automatically create a predefined modem interface that can be used to interface with the Bluetooth protocol stack and Bluetooth radio module. In particular, the process first utilizes and manipulates the operating system "registry," which essentially is a database utilized by the operating system to store information about the configuration, settings and options of the operating system and the computing device hardware. More specifically, the registry is "configured" or "spoofed" into believing that there are TAPI locations available on the system. In this way, an automated process can then be used to create the modem interface, and in a manner so that no user interaction is required. Then, after the automated modem process has been completed, whatever changes were made to the registry are reversed so that the system returns to its prior state and will thus prompt the user to enter the proper configuration information in the event that an actual modem is ever installed via TAPI services or Dial-Up Networking functions.

Thus, referring to FIG. 3, the method begins at the series of process steps indicated at 310. Here, the process actually disables the TAPI Location Information Dialog from being invoked. To do so, the process analyzes and then manipulates certain contents of the Windows registry. In the preferred embodiment, this is accomplished by first reading a value in the registry, referred to as the "NextID" value, as is indicated at process step 312. In one exemplary embodiment, the NextID value is at registry location HKEY_LOCAL_MACHINE\SOFTWARE\Microsoft\ Windows\CurrentVersion\Telephony\Locations. Of course, depending on the particular Windows system involved, this particular location may vary. This NextID value is associated with the number of sub-keys defined in the location section of the registry. For example, if multiple different telephony devices (e.g., modems) have been installed on the computer, the "NextID" value may be equal to the number of such devices plus 1. Thus, this value can then be used to define a new location sub-key. A sub-key is a data element of the registry. At process step 314, If there are no sub-keys defined in the location section of the registry, the method will create a new sub-key and add 1 to the "NextID" value. In particular, this is done to trick or spoof the computer into thinking that a location has already been defined for the modem interface that is going to be created. This in turn prevents the system form invoking the TAPI Location Information dialog, thereby permitting the process to proceed with the modem installation routine.

With continued reference to FIG. 3, the method then proceeds with the series of steps indicated at 320. These process steps comprise one presently preferred embodiment of the steps used to automatically install the modem interface for the Bluetooth device. Specifically, they are as series of macro based commands that can be used to create the modem interface. These macro based commands are system commands that simulate a user's selection or keyboard strokes; however, no user intervention is required. For example, a macro based command could be created to pull down a particular menu and select a particular item from the menu. A macro based command could also be created to enter a user's name into a corresponding dialog. Here, the method utilizes the manual procedure in the Windows operating system for installing a new modem. For example, the modem.cpl control panel applet, the Phone and Modem Options dialog, the Add/Remove Hardware Wizard dialog, and others, which are provided by the operating system, are utilized. However, the various options are all entered automatically, and no user input is required.

Thus, beginning at process step 322, the method executes the modem.cpl applet (control panel device). Once invoked, the process proceeds to step 324 and selects the "Add" from the Phone and Modem Options dialog so as to select the installation of a new modem. At step 326, the process selects an option from the Add/Remove Hardware wizard dialog that prevents the system from detecting the presence of a modem, and allows it to instead select from a list (e.g., "Don't detect my modem, I will select it from a list"). The method then proceeds to that portion of the dialog where the modem type is selected, as is designated at block 328 in FIG. 3. For example, in a preferred embodiment, the process will automatically select a "standard 9600 bps modem" from the list of standard modem types. Of course, other selections could be made depending on the configuration requirements.

Once the modem type has been selected, the process continues at step 330. Here, the COM port corresponding to the Bluetooth module is selected. Preferably, the method scans the ports listbox for the Bluetooth COM port, and then selects it. Also, this step may be repeated to also select the Bluetooth DUN COM port and the Bluetooth FAX COM port, depending on the particular configuration desired. The method then selects and invokes the "Finish" selection, so as to complete the installation dialog. At this point, the appropriate modem interface, corresponding to the installed Bluetooth device, has been installed. Moreover, the installation has been completely automatic and transparent to the user.

At this point in the process, the method reconfigures the registry so as to return it to its original state (i.e., reverse the changes made at step 314). Thus, if the registry was altered in the analysis and configuring step at 314 of the method, the added sub-key will be deleted and the "NextID" value will be decreased by 1. This step is performed so that the next time an actual modem is installed on the computer, the Registry contents will allow the TAPI Location Information dialog (or similar function) to be invoked, so that the proper information will be requested from the user. If the registry was not changed back to the original state, the computer may not prompt the user for an area code when a modem is installed, thereby resulting in an improper installation.

Thus, to summarize, the above described process completely automates the installation of a modem interface for a Bluetooth device. Importantly, the process is transparent to the user, thereby providing an extremely simplistic installation procedure. This avoids errors on the user's part, and helps insure a smooth installation process. Moreover, it results in a operating interface for the Bluetooth device that is usable by a wide number of existing legacy applications. Consequently, the Bluetooth capabilities can be utilized by existing applications without the need for new program interfaces and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for automatically creating a modem interface for use with a modem accessible across a Bluetooth network, wherein the method comprises:

analyzing a database to determine if a location data packet has been entered;

upon the determination that no location data packet has been entered, creating a new location data packet in the database such that a user will not be prompted for location information during a manual modem installation procedure;

automatically performing a series of installation commands to create the modem interface without any user intervention, wherein the modem interface relates to the modem accessible across the Bluetooth network; and deleting the new location data packet such that the database is returned to an original state.

2. The method for automatically creating a modem interface of claim 1, wherein the database is an operating system registry and a location data packet is a sub-key in the location section of the registry.

3. The method for automatically creating a modem interface of claim 1, wherein the series of installation commands are performed via predefined operating system installation commands.

4. The method for automatically creating a modem interface of claim 1, wherein the method further comprises the step of connecting a Bluetooth wireless device to a COM port, wherein the modem interface is used to exchange data with the Bluetooth wireless device.

5. A computer-readable medium having computer-executable instructions for performing the steps comprising:

analyzing a database to determine if a location data packet has been entered;

upon the determination that no location data packet has been entered, creating a new location data packet in the database such that a user will not be prompted for location information during a manual modem installation procedure;

performing a series of macro based installation commands to automatically create a modem interface using the manual modem installation procedure, wherein the modem interface relates to a modem accessible across a Bluetooth network; and deleting the new location data packet such that the database is returned to an original state.

6. The computer-readable medium of claim 5, wherein the database is an operating system registry and a location data packet is a sub-key in the location section of the registry.

7. The computer-readable medium of claim 5, wherein the series of macro based commands are performed via predefined operating system installation commands.

* * * * *